US012254831B2

(12) United States Patent
Kim et al.

(10) Patent No.: US 12,254,831 B2
(45) Date of Patent: Mar. 18, 2025

(54) DISPLAY DEVICE

(71) Applicant: LG Display Co., Ltd., Seoul (KR)

(72) Inventors: Junghyeon Kim, Paju-si (KR); Taewook Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/542,232

(22) Filed: Dec. 15, 2023

(65) Prior Publication Data

US 2024/0221663 A1 Jul. 4, 2024

(30) Foreign Application Priority Data

Dec. 29, 2022 (KR) ........................ 10-2022-0188809

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/045* (2013.01)

(58) Field of Classification Search
None
See application file for complete search history.

(56) References Cited

U.S. PATENT DOCUMENTS

2015/0035735 A1* 2/2015 Kang .................. G09G 3/3291 345/77
2018/0190198 A1* 7/2018 Kim ..................... G09G 3/3291
2023/0094280 A1* 3/2023 Lee ...................... G09G 3/3258 345/691

FOREIGN PATENT DOCUMENTS

KR 10-2017-0021406 A 2/2017

* cited by examiner

*Primary Examiner* — Parul H Gupta
(74) *Attorney, Agent, or Firm* — Fenwick & West LLP

(57) ABSTRACT

A display device comprises a pixel circuit including a driving element having a gate electrode connected to a first node and a source electrode connected to a second node, a light emitting element connected to the second node, a first switch element that connects a data line and the first node, and a second switch element that connects a reference voltage line and the second node; a gate driver that supplies a scan signal to the gate line; and a sensing circuit that senses a voltage of the reference voltage line during a sensing period, wherein during an initialization period the scan signal is higher than the sensing data voltage, during the sensing period, the scan signal is higher than the first ground voltage and lower than the sensing data voltage, during the sensing period, a voltage of the second node is stored in a sensing capacitor.

21 Claims, 10 Drawing Sheets

DISPLAY DEVICE

CROSS REFERENCE TO RELATED APPLICATION

The present application claims priority to Republic of Korea Patent Application No. 10-2022-0188809, filed Dec. 29, 2022, which is hereby incorporated by reference in its entirety.

BACKGROUND

Field of Technology

This disclosure relates to a display device.

Description of the Related Art

An organic light emitting diode (OLED) which is a self-emitting device includes an anode electrode, a cathode electrode, and an organic compound layer formed therebetween. The organic compound layer comprises a hole transport layer (HTL), an emission layer (EML), and an electron transport layer (ETL). When a driving voltage is applied to the anode electrode and the cathode electrode, holes which pass through the hole transport layer (HTL) and electrons which pass through the electron transport layer (ETL) move to the emission layer (EML) to form excitons so that the emission layer (EML) generates visible rays. An active matrix type organic light emitting display device includes an organic light emitting diode (OLED) which is a self-emitting device and is used in various ways with the advantages of a fast response speed, large emission efficiency, luminance, and viewing angle.

The display device arranges pixels each including an organic light emitting element in a matrix form, wherein the luminance of the pixel is adjusted in accordance with a gray scale level of video data.

Each pixel includes an organic light emitting element, a driving transistor configured to control a driving current flowing through the organic light emitting element in accordance with a voltage between the gate and the source, and at least one switching transistor which programs the voltage between the gate and the source of the driving transistor.

SUMMARY

An object to be solved by the disclosure is to provide a display device capable of controlling two switch elements through one scan signal.

The objects of the disclosure are not limited to the objects mentioned above, and other technical objects not mentioned will be clearly understood by those skilled in the art from the following description.

In order to achieve the above object, a display device according to an embodiment comprises a pixel circuit including a driving element having a gate electrode connected to a first node and a source electrode connected to a second node, a light emitting element connected to the second node, a first switch element that connects a data line charged with a sensing data voltage and the first node based on a scan-on voltage from a gate line, and a second switch element that connects a reference voltage line initialized to have a first ground voltage and the second node based on the scan-on voltage from the gate line; a gate driver that supplies a scan signal with the scan-on voltage to the gate line; and a sensing circuit that senses a voltage of the reference voltage line changed by a current flowing through the driving element during a sensing period, wherein during an initialization period preceding the sensing period, the scan-on voltage of the scan signal is higher than the sensing data voltage, during the sensing period, the scan-on voltage of the scan signal is higher than the first ground voltage and lower than the sensing data voltage, during the sensing period, a voltage of the second node that is proportional over time and caused by a constant current is stored in a sensing capacitor connected to the reference voltage line.

In order to achieve the above object, a display device comprising a plurality of pixels, wherein each pixel comprises a pixel circuit, the pixel circuit comprises: a driving transistor having a gate electrode connected to a first node and a source electrode connected to a second node; a light emitting element connected to the second node, a first switch element having a gate electrode connected to a gate line supplied with a scan signal, a source electrode connected to a data line supplied with a sensing data voltage and a drain electrode connected to the first node; and a second switch element having a gate electrode connected to the gate line, a source electrode connected to a reference voltage line and a drain electrode connected to the second node, wherein during an initialization period, a first ground voltage from the reference voltage line is supplied to the source electrode of the second switch element, and a first voltage of the scan signal is higher than the sensing data voltage and the first ground voltage, and during a sensing period after the initialization period, the reference voltage line is not supplied with the first ground voltage, a second voltage of the scan signal is lower than the first voltage and lower than the sensing data voltage, a current flow through the reference voltage line keeps a constant current, and a voltage through the reference voltage line is direct proportional to time and is stored in a sensing capacitor connected to the reference voltage line.

Other details of embodiments are included in the detailed description and drawings.

According to embodiments, a display device capable of controlling two switch elements through one scan signal may be provided.

According to embodiments, the number of gate lines for controlling two or more switch element can be reduced, so the aperture ratio of the pixel can be improved.

According to embodiments, a constant current sensing is possible with only one scan signal, allowing mobility characteristics of a driving element to be sensed quickly.

Effects according to embodiments are not limited by the descriptions exemplified above, and more various effects are included in this specification.

DETAILED DESCRIPTION

Advantages and features of this disclosure and methods of accomplishing the same may be understood more readily by reference to the detailed description of embodiments that will be made hereinafter with reference to the accompanying drawings. This disclosure may, however, be embodied in many different forms and should not be construed as being limited to the exemplary embodiments set forth herein; rather, these exemplary embodiments are provided so that this disclosure will be thorough and complete and will fully convey the concept of the invention to those skilled in the art, and the present invention will only be defined by the appended claims.

Although the terms “first”, “second”, and the like are used to describe various components, these components are not limited by these terms. These terms are merely used for distinguishing one component from the other components. Therefore, the first component mentioned hereinafter may be the second component in the technical sense of the disclosure.

The respective features of various embodiments of the disclosure may be partially or overall coupled to or combined with each other, and may be variously inter-operated with each other and driven technically. The embodiments of the disclosure may be carried out independently from each other, or may be carried out together in co-dependent relationship.

Hereinafter, exemplary embodiments will be described in detail with reference to the accompanying drawings.

Figure 1:
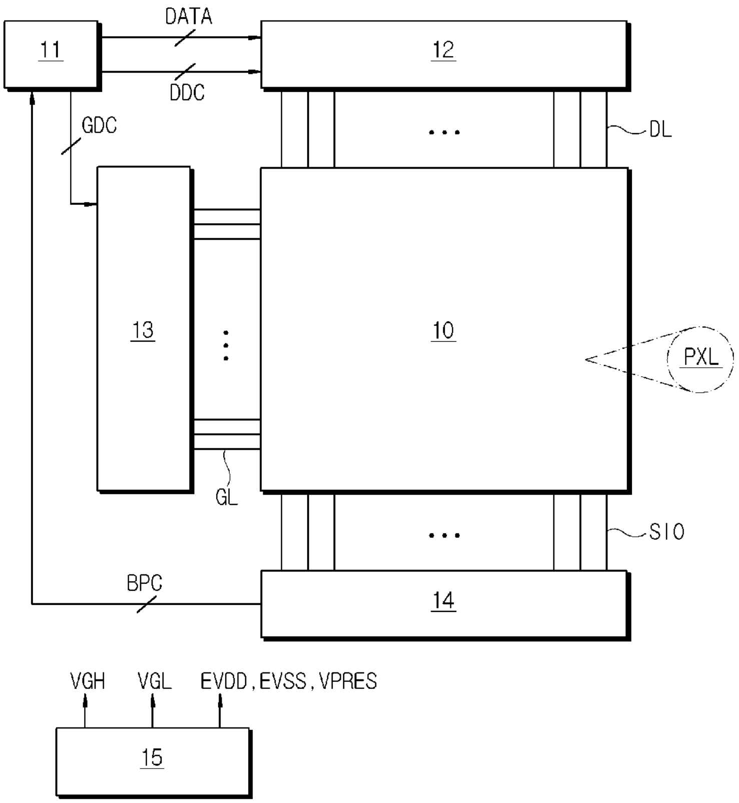
FIG. 1 is a block diagram of a display device according to an embodiment.

FIG. 1 is a block diagram of a display device according to an embodiment.

Referring to FIG. 1, a display device according to an embodiment may include a display panel 10, a timing controller 11, a data driver 12, a gate driver 13, a sensing circuit 14, and a power circuit 15.

On a screen on which an input image is displayed on the display panel 10, data lines DLs extending in a column direction (or a vertical direction) and gate lines GLs extending in a row direction (or a horizontal direction) intersect, and unit pixels PXLs are arranged in a matrix form in each intersection area to form a pixel array. The respective data lines DLs are commonly connected to adjacent unit pixels PXLs in the column direction, and the respective gate lines GLs are commonly connected to adjacent unit pixels PXLs in the row direction.

Each of the unit pixels PXLs includes a plurality of sub-pixels. The plurality of sub-pixels constitutes one unit pixel PXL to create various color combinations. To simplify the pixel array, sub-pixels constituting the same unit pixel PXL may share the same reference voltage line REF.

The timing controller 11 receives timing signals such as a vertical synchronization signal Vsync, a horizontal synchronization signal Hsync, a data enable signal DE, and a dot clock DCLK from a host system and generates timing control signals for controlling the operation timing of the data driver 12 and gate driver 13. The timing control signals may include a gate timing control signal GDC for controlling the operation of the gate driver 13 and a data timing control signal DDC for controlling the operation of the data driver 12.

The timing controller 11 receives image data DATA from the host system and receives a sensing signal for each sub-pixel from the sensing circuit 14. The timing controller 11 may extract characteristics of each sub-pixel by converting the sensing signal.

Display driving may be performed in a vertical active period in which a data enable signal transitions between a logic high level and a logic low level in one frame, and sensing driving may be performed in a vertical blank period excluding the vertical active period in one frame. During the vertical blank period, the data enable signal continues to maintain a logic low level.

The data driver 12 is connected to sub-pixels through data lines DL. The data driver 12 generates data voltages required for display driving or sensing driving of sub-pixels based on the data timing control signal DDC and supplies the data voltages to the data lines DLs. The data voltage for display driving is obtained by performing digital-to-analog conversion on the image data DATA, and for the digital-to-analog conversion, the data driver 12 may include a plurality of digital-to-analog converters.

The data driver 12 may include a plurality of source driving integrated circuits. The source driving integrated circuit may include a shift register, a latch, the digital analog converters, an output buffer, and the like.

The gate driver 13 is connected to sub-pixels through gate lines GLs. The gate driver 13 generates scan signals based on the gate timing control signal GDC, and supplies each scan signal to the gate lines GL based on the supply timing of the data voltage. The horizontal display line to which the data voltage is to be supplied is selected by the scan signal.

The gate driver 13 generates the scan signal for display driving and supplies the scan signal to the gate lines GL based on the supply timing of a display data voltage.

The gate driver 13 may include a plurality of gate drive integrated circuits each including a gate shift register, a level shifter for converting an output signal of the gate shift register into the swing width of a scan-on voltage and scan-off voltage, an output buffer, and the like. Alternatively, the gate driver 13 may be directly formed on the substrate of the display panel 10 using a gate driver in panel (GIP) method. In the case of the GIP method, the level shifter may be mounted on a control printed circuit board, and the gate shift register may be formed in a bezel area, which is a non-display area, of the display panel 10. The gate shift register includes a plurality of scan output stages (hereinafter referred to as GIP elements) connected to each other in a cascade manner. The GIP elements are independently connected to the gate lines GLs and output scan signals to the gate lines GLs.

The sensing circuit 14 is connected to the unit pixels PXLs of the display panel 10 through reference voltage lines REFs. The sensing circuit 14 senses the voltage of the reference voltage line REF, which is changed by the current flowing through the sub-pixels during sensing driving, and converts the sensed voltage value into a digital signal to generate a sensing signal. Then, this sensing signal is transmitted to the timing controller 11.

The power circuit 15 generates a high-potential driving voltage EVDD and low-potential driving voltage EVSS required for display driving and sensing driving of sub-pixels. The power circuit 15 generates an initialization voltage required for sensing and driving the sub-pixels. The power circuit 15 generates a first reference voltage VpreS for initializing the reference voltage line REF during sensing driving.

The power circuit 15 generates the scan-on voltages VGHs and scan-off voltage VGL of at least two voltage levels required for sensing driving, and supplies the voltages to the level shifter of the gate driver 13. The level shifter may modulate scan clocks to be applied to the GIP element based on the scan-on voltages VGHs of two voltage levels or greater.

Figure 2:
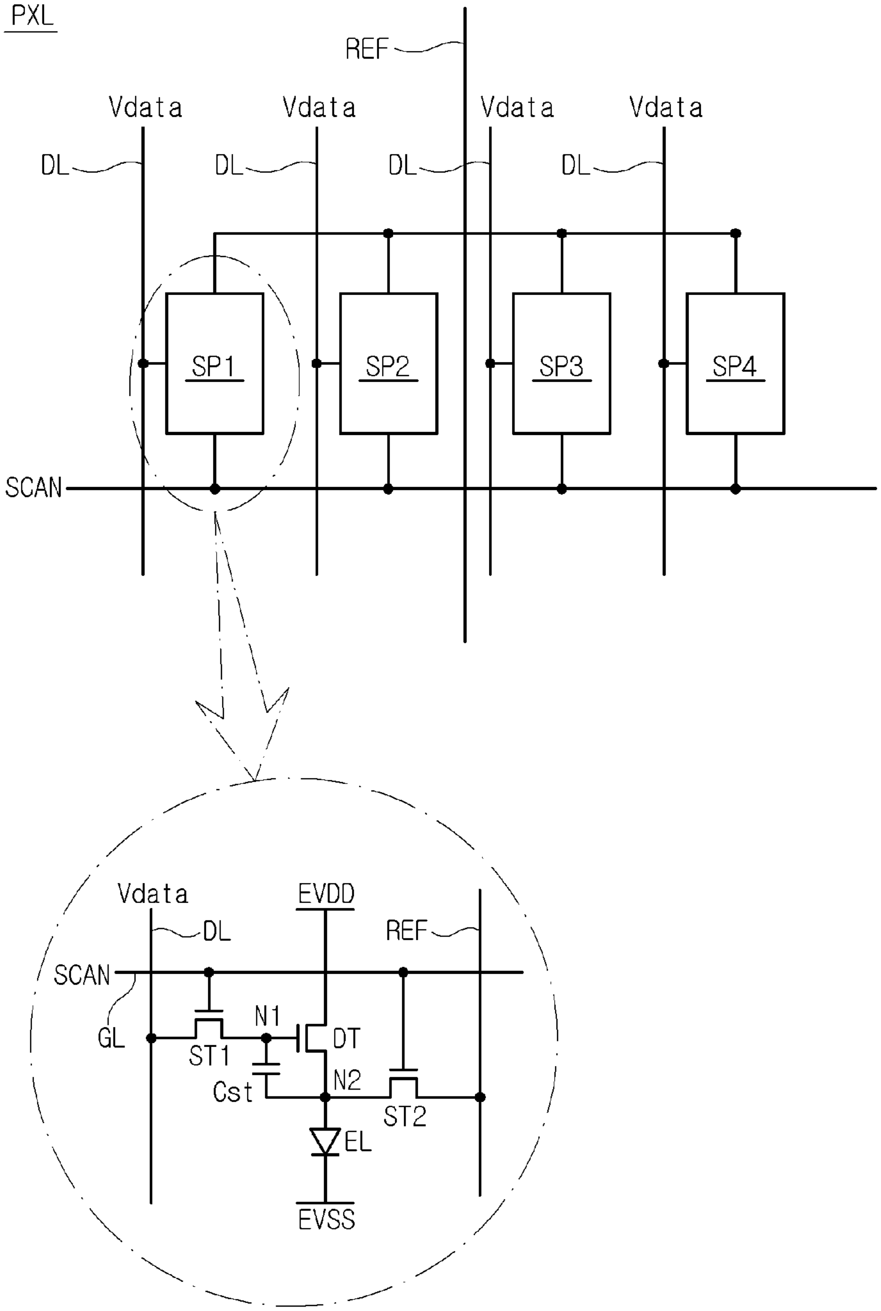
FIG. 2 is a diagram illustrating a connection configuration of one unit pixel of a display device according to an embodiment.

FIG. 2 is a diagram illustrating a connection configuration of one unit pixel of a display device according to an embodiment.

Referring to FIG. 2, a unit pixel PXL may include four sub-pixels SP1, SP2, SP3, and SP4 sharing a reference voltage line REF. The four sub-pixels SP1, SP2, SP3, and SP4 may be red R, green G, blue B, and white W sub-pixels. Each of the sub-pixels SP1, SP2, SP3, and SP4 may include, for example, a light emitting element EL, a driving element DT, switch elements ST1 and ST2, and a storage capacitor Cst.

The light emitting element EL emits light based on the display driving current supplied from the driving element DT. The light emitting element EL emits light only in display driving and does not emit light in sensing driving. The light emitting element EL may be implemented as an organic light emitting diode including an organic light emitting layer or an inorganic light emitting diode including an inorganic light emitting layer. In the light emitting element EL, an anode electrode is connected to a second node N2, and a cathode electrode is connected to an input terminal of a low-potential driving voltage EVSS.

In the driving element DT, a gate electrode is connected to a first node N1, a drain electrode is connected to an input terminal of a high-potential driving voltage EVDD, and a source electrode is connected to the second node N2. In display driving, the driving element DT generates a display driving current based on a first gate-source voltage, that is, a difference voltage between the display data voltage and the reference voltage, and supplies the display driving current to the light emitting element EL. An operation of the driving element DT during sensing operation will be described later with reference to FIGS. 3 to 5.

The switch elements ST1 and ST2 receive the same scan signal SCAN according to one scan method. The one scan method for display driving in the present embodiment is the same as the existing one scan method. Accordingly, the switch elements ST1 and ST2 are simultaneously turned on/off by the same scan signal SCAN in display driving. On the other hand, the one scan method for sensing driving in the present embodiment is different from the existing one scan method. Accordingly, the switch elements ST1 and ST2 may be simultaneously turned on by the same scan signal SCAN in sensing driving and then turned off at different timings.

The first switch element ST1 is connected between the data line DL and the first node N1 and turned on based on the scan signal SCAN from the gate line GL. The first switch element ST1 is turned on in programming for display driving and also turned on during the initialization period (t1 in FIG. 3) for sensing driving. When the first switch element ST1 is turned on, the sensing data voltage SVdata or the display data voltage Vdata is applied to the first node N1.

In the first switch element ST1, a gate electrode is connected to the gate line GL, a source electrode is connected to the data line DL, and a drain electrode is connected to the first node N1.

The second switch element ST2 is connected between the reference voltage line REF and the second node N2 and turned on based on to the scan signal SCAN from the gate line GL. The second switch element ST2 is turned on in programming for display driving and applies the reference voltage charged in the reference voltage line REF to the second node N2. The second switch element ST2 is turned on during the initialization period (t1 in FIG. 3) for sensing driving and applies the ground voltage charged in the reference voltage line REF to the second node N2, and maintains an on state even during the sensing period (t2 in FIG. 3) following the initialization period (t1 in FIG. 3) to change the voltage at the reference voltage line REF by the voltage at the second node N2. In the second switch element ST2, a gate electrode is connected to the gate line GL, a drain electrode is connected to the second node N2, and a source electrode is connected to the reference voltage line REF.

The storage capacitor Cst is connected between the first node N1 and the second node N2 to store the gate-source voltage of the driving element DT.

The operations of the first and second switch elements ST1 and ST2 during a sensing period will be described in more detail with reference to FIGS. 3 to 5.

Figure 3:
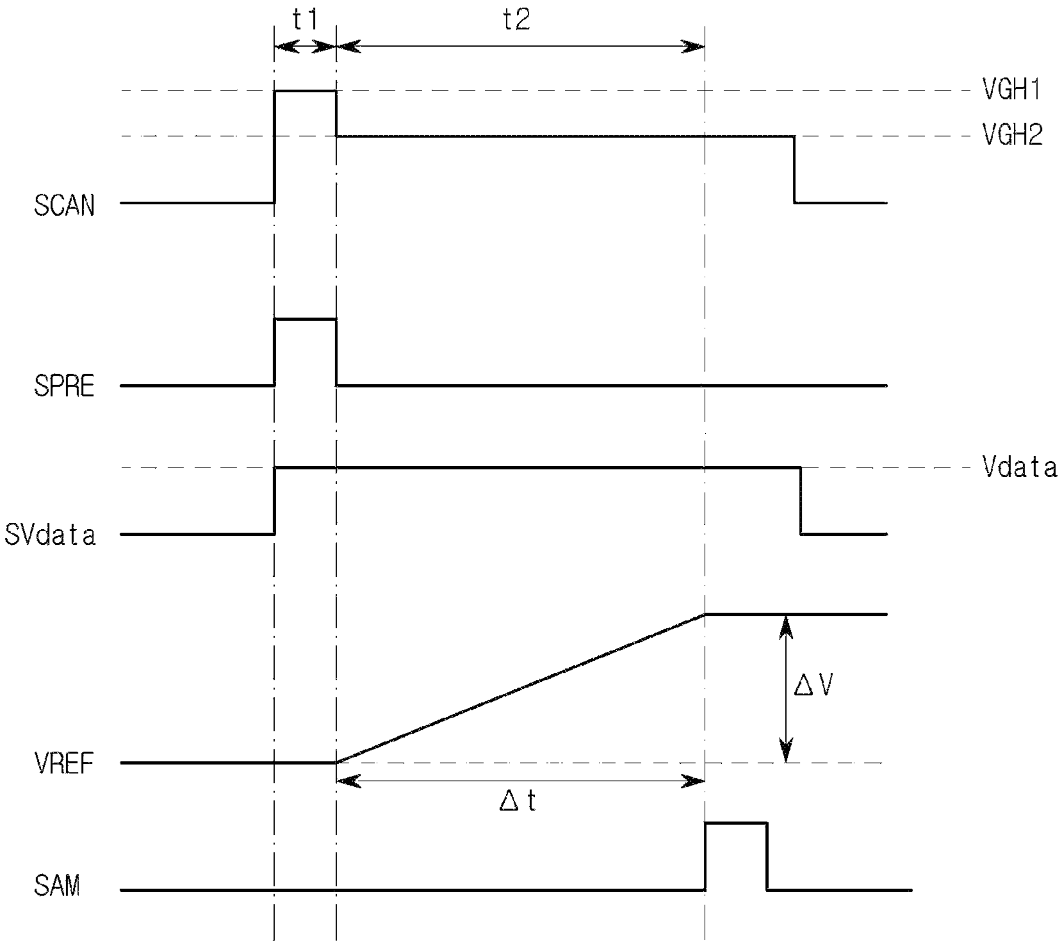
FIG. 3 is a waveform diagram of signals applied to one unit pixel of a display device according to an embodiment.

FIG. 3 is a waveform diagram of signals applied to one unit pixel of a display device according to an embodiment. FIG. 4 is a circuit diagram of one unit pixel of a display device for a first period according to an embodiment. FIG. 5 is a circuit diagram of one unit pixel of a display device for a second period according to an embodiment. FIG. 3 illustrates signals applied to one unit pixel PXL of the display device in the sensing period. A first period may be the initialization period t1, and a second period may be the sensing period t2.

Figure 4:
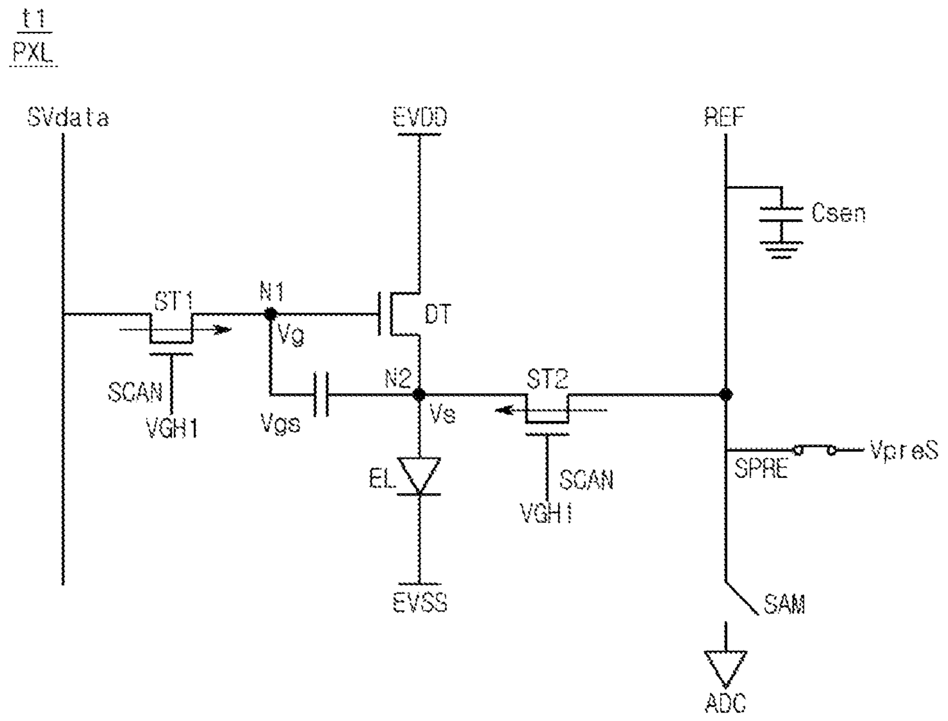
FIG. 4 is a circuit diagram of one unit pixel of a display device during a first period according to an embodiment.

Referring to FIGS. 3 and 4, during the initialization period t1, the scan signal SCAN has a first voltage VGH1, and the first switch SPRE connected to the reference voltage line REF is turned on, so that a first reference voltage VpreS is applied to the reference voltage line REF, and a sensing data voltage SVdata is applied from the data line. The scan signal SCAN may have a first voltage VGH1 that turns on the first and second switch elements ST1 and ST2. During the initialization period t1, the sensing data voltage SVdata is applied to the first node N1 and the first reference voltage VpreS is applied to the second node N2, so that the sensing data voltage SVdata is applied to the gate electrode of the driving element DT, and the first reference voltage VpreS is applied to the source electrode of the driving element DT to initialize a difference voltage Vgs between the gate electrode and source electrode of the driving element DT.

In order to apply the sensing data voltage SVdata to the first node N1, the first voltage VGH1 has a voltage level that turns on the first switch element ST1, and the first voltage VGH1 may have a voltage sufficiently higher than the sensing data voltage SVdata. For example, the first voltage VGH1 may have a voltage higher than the sum of the sensing data voltage SVdata and the threshold voltage of the first switch element ST1. Similarly, in order to apply the first reference voltage VpreS to the second node N2, the first voltage VGH1 has a voltage level that turns on the second switch element ST2, and the first voltage VGH1 may have a voltage sufficiently higher than the first reference voltage VpreS. For example, the first voltage VGH1 may have a voltage higher than the sum of the first reference voltage VpreS and the threshold voltage of the second switch element ST2.

Figure 5:
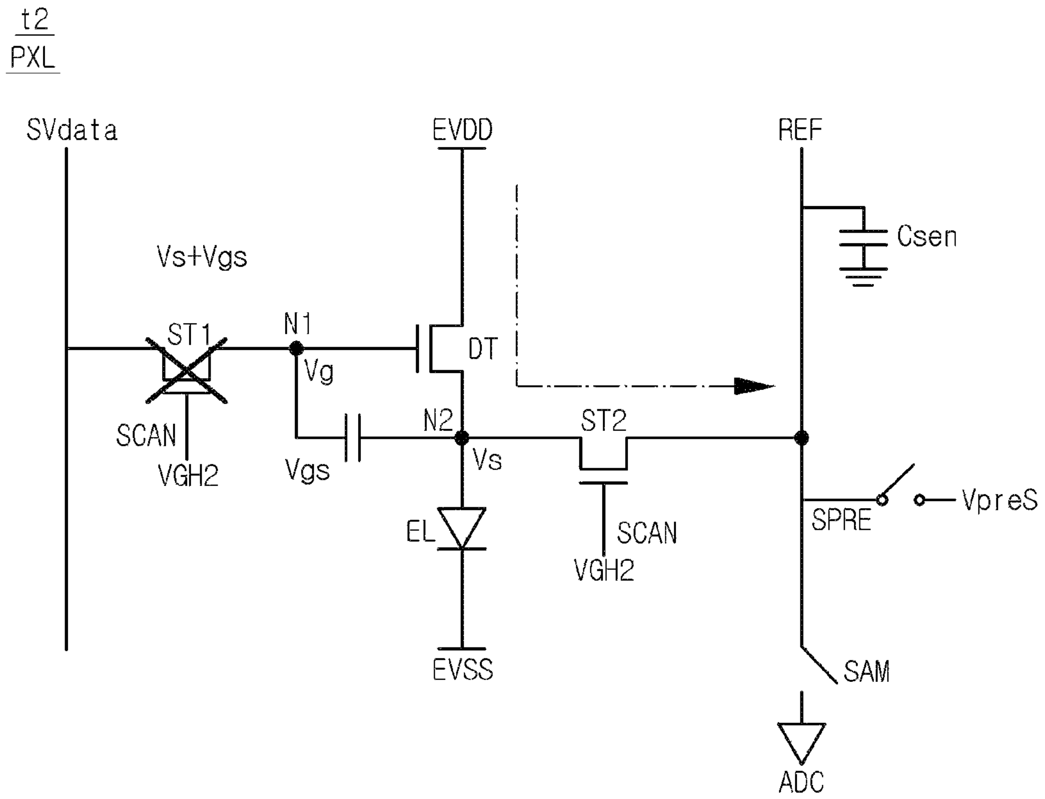
FIG. 5 is a circuit diagram of one unit pixel of a display device during a second period according to an embodiment.

Next, referring to FIGS. 3 and 5, during the sensing period t2, the scan signal SCAN has a second voltage VGH2 having a smaller magnitude than that of the first voltage VGH1, and the first switch SPRE connected to the reference voltage line REF is turned off, and the sensing data voltage SVdata is applied from the data line. The scan signal SCAN may have a second voltage VGH2 that turns off the first switch element ST1 and simultaneously turns on the second switch element ST2. The second voltage VGH2 may be less than the first voltage VGH1, may be smaller than the sum of the sensing data voltage SVdata and the threshold voltage of the first switch element ST1 to turn off the first switch element ST1, and may be greater than the sum of the voltage Vs applied to the second node N2 and the threshold voltage of the second switch element ST2 to turn on the second switch element ST2.

According to an embodiment, during the sensing period t2, the first switch element ST1 is turned off and the second switch element ST2 is turned on. Even during the initialization period t1, the sensing data voltage SVdata capable of turning on the driving element DT is applied to the gate electrode (or the first node N1) of the driving element DT, but since the first reference voltage VpreS is applied to the second node N2 through the second switch element ST2, current may not flow from the drain electrode to source electrode of the driving element DT. On the other hand, during the sensing period t2, the second switch element ST2 is turned on, but the first reference voltage VpreS is not applied to the second node N2, and thus current may flow from the drain electrode to source electrode of the driving element DT. The current flowing from the drain electrode to source electrode of the driving element DT may not flow to the light emitting element EL. The reason why the current flowing from the drain electrode to source electrode of the driving element DT does not flow through the light emitting element EL is because the voltage at the second node N2 is always designed to be smaller than the threshold voltage of the light emitting element EL. Accordingly, the current flowing from the drain electrode to source electrode of the driving element DT may flow from the drain electrode to source electrode of the turned-on second switch element ST2, as illustrated in FIG. 5.

Meanwhile, the magnitude of the current flowing from the drain electrode to source electrode of the turned-on second switch element ST2 may be directly proportional to the difference voltage Vgs between the gate electrode and source electrode of the driving element DT (or the difference voltage between the first node N1 and the second node N2).

Since the first switch element ST1 connected to the first node N1 is turned off, the difference voltage Vgs between the gate electrode and source electrode of the driving element DT (or the difference voltage between the first node N1 and the second node N2) is maintained at a constant value by a capacitor and the current formed from the drain electrode of the driving element DT flows in the second node N2. Therefore, the voltage Vs of the second node N2 gradually increases, and the voltage of the first node N1 may have the magnitude Vs+Vgs of the sum of the gradually increasing voltage of the second node N2 and the difference voltage Vgs between the gate electrode and source electrode of the driving element DT.

As described above, since the second voltage VGH2 should be greater than the sum of the voltage Vs applied to the second node N2 and the threshold voltage of the second switch element ST2 in order to turn on the second switch element ST2, the second voltage VGH2 should be set in consideration of the gradually increasing voltage range of the second node N2.

The voltage Vs of the second node N2 may be the same as the voltage stored in the sensing capacitor Csen connected to the reference voltage line REF. As described above, a gradually increasing voltage may be stored in the sensing capacitor Csen corresponding to the gradually increasing voltage Vs of the second node N2.

As illustrated in FIG. 3, the voltage applied to the reference voltage line REF may increase in direct proportion to time during the sensing period t2 ($\Delta t \propto \Delta V$). The voltage applied to the reference voltage line REF is equal to the voltage stored in the capacitor Csen and the voltage Vs of the second node N2. The reason why the voltage applied to the reference voltage line REF increases in direct proportion to time during the sensing period t2 is that the magnitude of the current flowing from the drain electrode to source electrode of the turned-on second switch element ST2 is proportional to the difference voltage Vgs between the gate electrode and source electrode of the driving element DT (or the difference voltage between the first node N1 and the second node N2), the first switch element ST1 connected to the first node N1 is turned off, the difference voltage Vgs between the gate electrode and source electrode of the driving element DT (or the difference voltage between the first node N1 and the second node N2) is maintained at a constant value by the capacitor, and the current flowing through the reference voltage line REF maintains a constant value (constant current). Accordingly, the voltage applied to the reference voltage line REF (or the voltage stored in the capacitor Csen) increases in direct proportion to time due to the constant current.

Then, the switch SAM is turned on during a sampling period. Accordingly, the voltage applied to the reference voltage line REF (or the voltage stored in the capacitor Csen) is applied to a data driver (see the reference sign of 12 in FIG. 1) via the ADC through the reference voltage line REF.

The data driver (see the reference sign of 12 in FIG. 1) receiving the voltage applied to the reference voltage line REF (or the voltage stored in the capacitor Csen) can calculate the mobility characteristics of the corresponding driving element DT.

According to an embodiment, the first switch element ST1 and the second switch element ST2 can be controlled through the scan signal SCAN of one gate line GL. That is, the number of gate lines for controlling two or more switch element can be reduced, so the aperture ratio of the pixel PXL can be improved.

In addition, when controlling the first switch element ST1 and the second switch element ST2 with a scan signal of one gate line, the first switch element ST1 and the second switch element ST2 are turned on/off simultaneously. Therefore, previously, the voltage applied to the reference voltage line REF (or the voltage stored in the capacitor Csen) did not increase in direct proportion with time. However, in the case of an embodiment, even if the first switch element ST1 and the second switch element ST2 are controlled with the scan signal SCAN of one gate line GL, during the initialization period t1, the scan signal SCAN has a first voltage VGH1, and during the sensing period t2, the scan signal SCAN has a second voltage VGH2 having a magnitude smaller than the first voltage VGH1, so that the sensing period t2, the first switch element ST1 may be turned off, and the second switch element ST2 may be turned on. Because of this, the current flowing in the reference voltage line REF maintains a constant value (constant current), and the voltage applied to the reference voltage line REF (or the voltage stored in the capacitor Csen) changes over time due to the constant current. It can increase in direct proportion. As a result, constant current sensing is possible with only one scan signal SCAN, allowing the mobility characteristics of the driving element DT to be sensed quickly.

Hereinafter, a display device according to another embodiment will be described.

Figure 6:
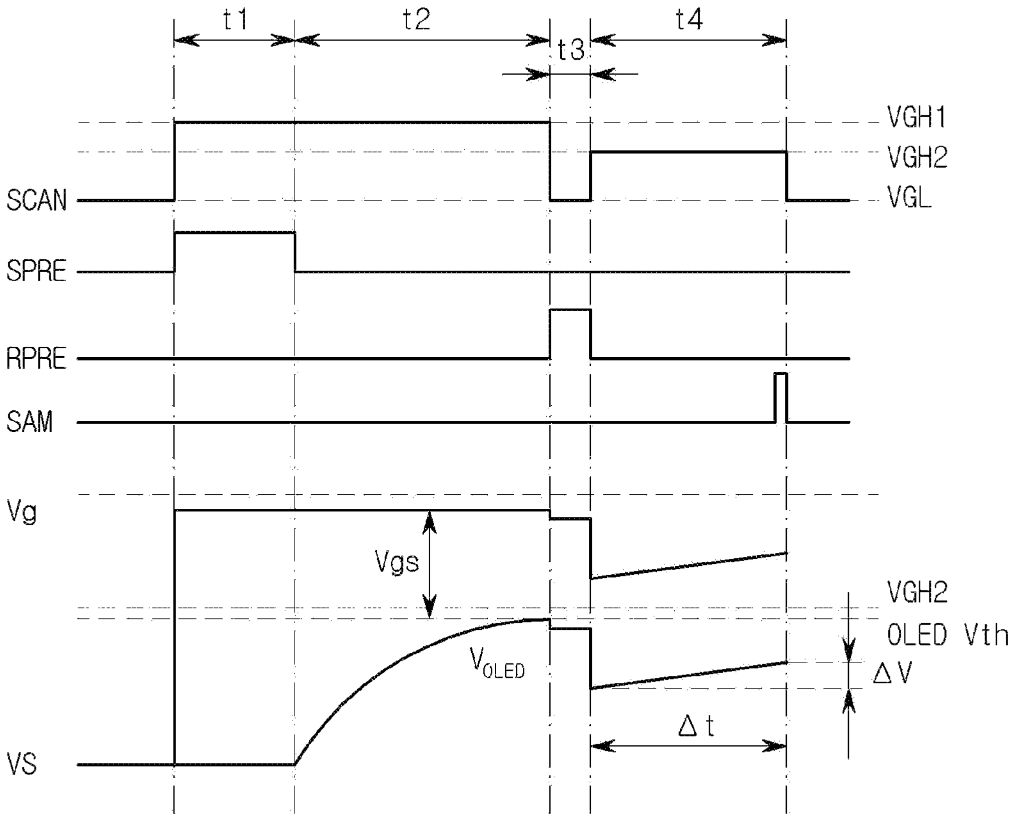
FIG. 6 is a waveform diagram of signals applied to one unit pixel of a display device according to another embodiment.
Figure 7:
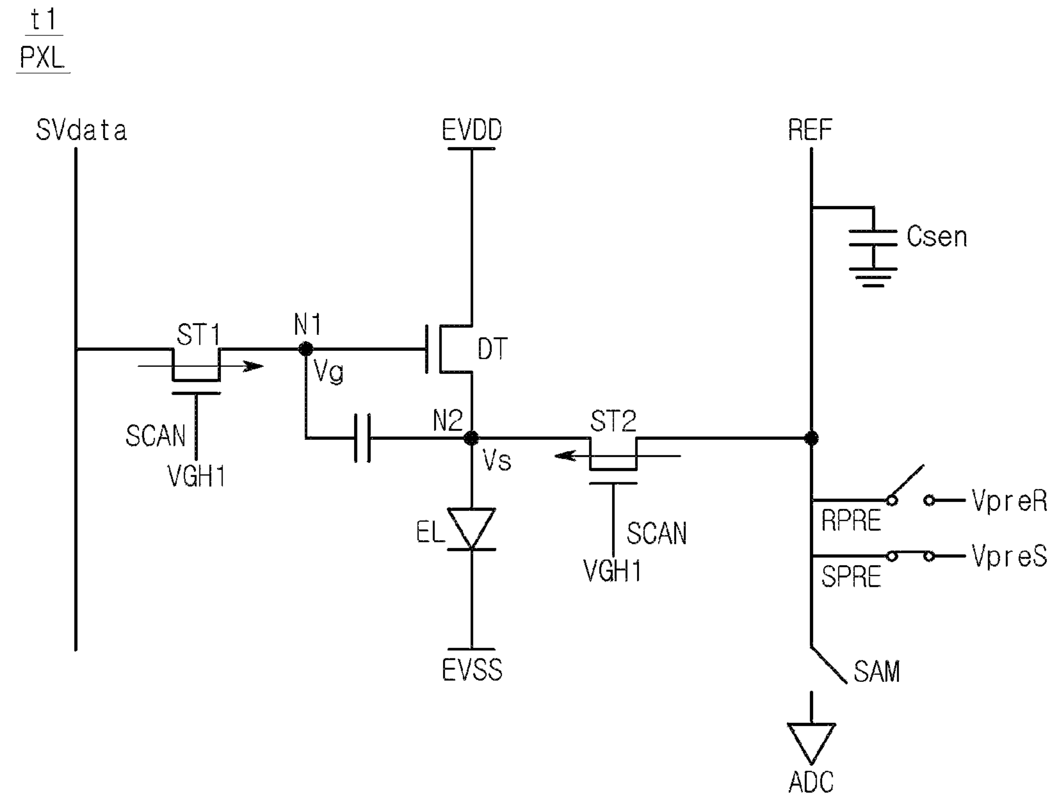
FIG. 7 is a circuit diagram of one unit pixel of a display device during a first period according to another embodiment.
Figure 8:
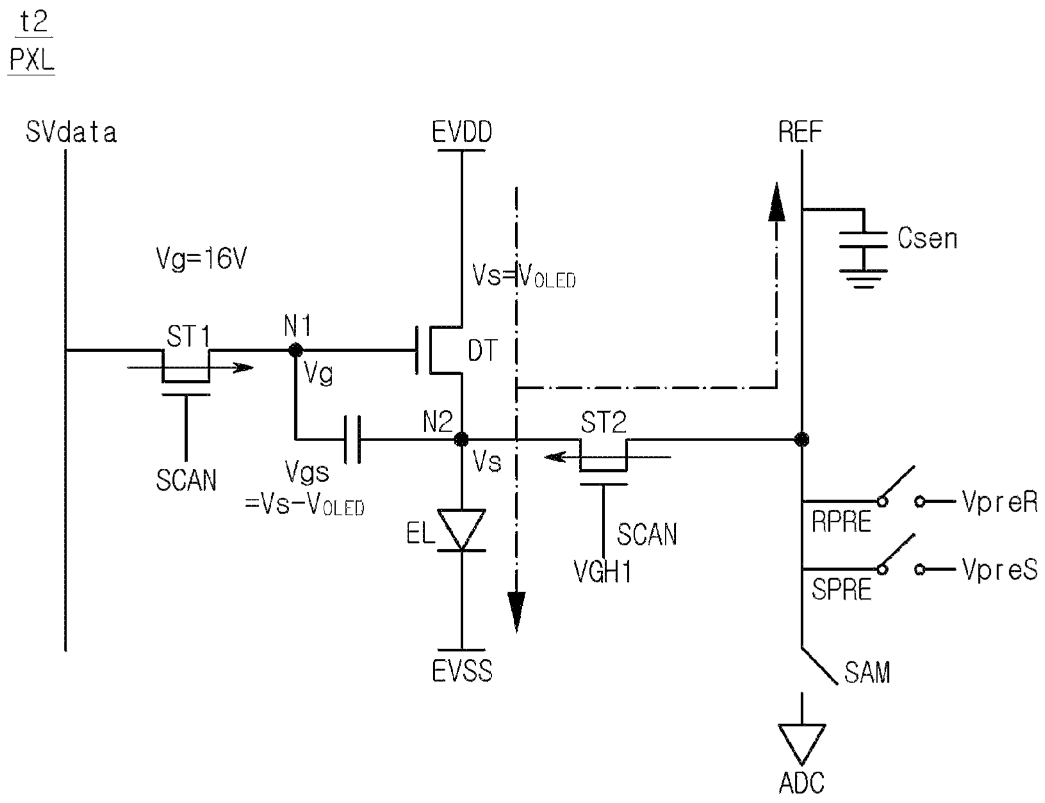
FIG. 8 is a circuit diagram of one unit pixel of a display device during a second period according to another embodiment.
Figure 9:
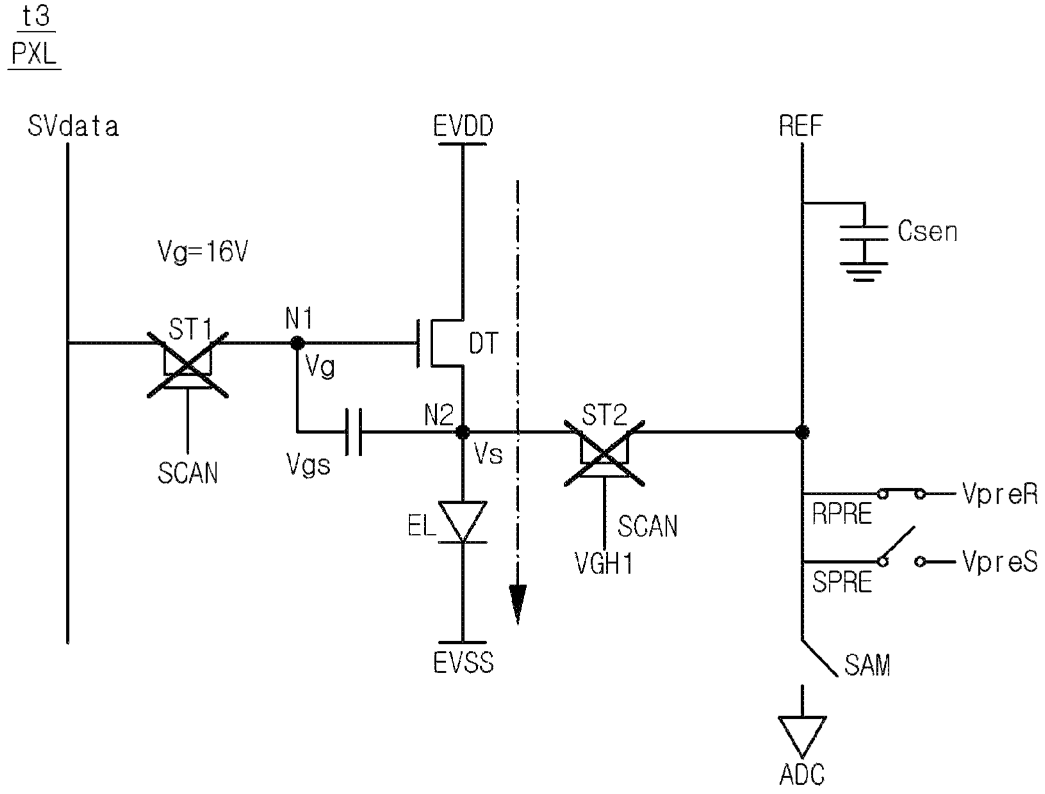
FIG. 9 is a circuit diagram of one unit pixel of a display device during a third period according to another embodiment.
Figure 10:
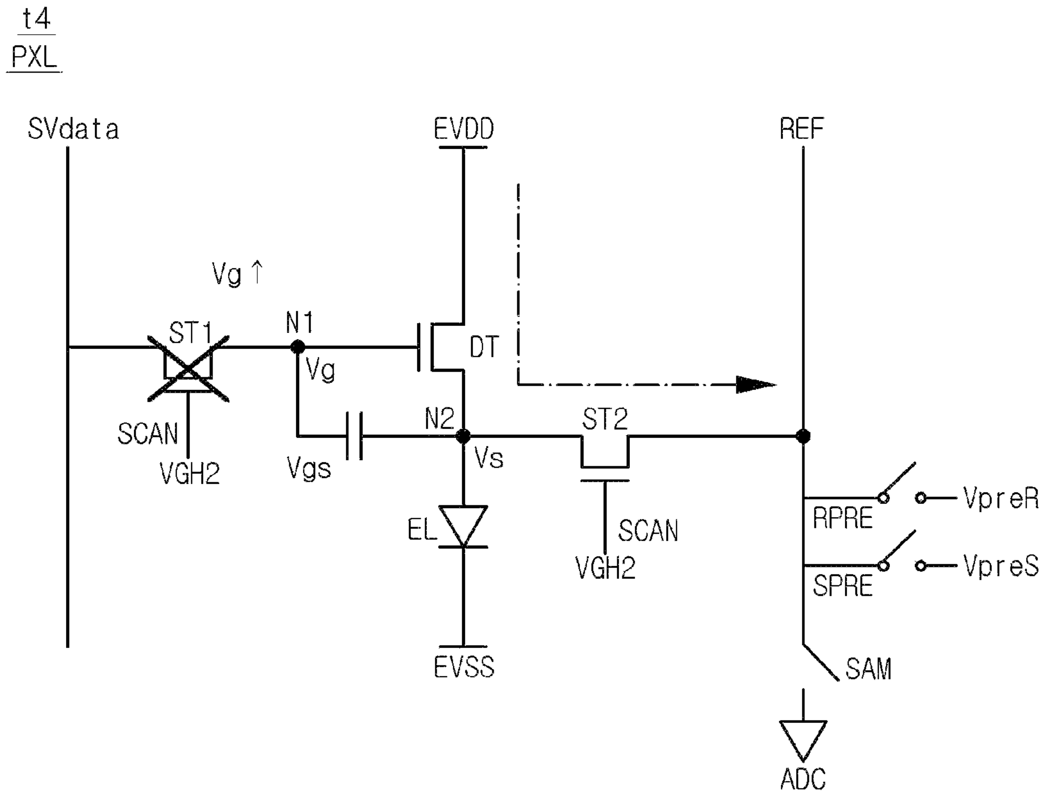
FIG. 10 is a circuit diagram of one unit pixel of a display device during a fourth period according to another embodiment.

FIG. 6 is a waveform diagram of signals applied to one unit pixel of a display device according to another embodiment. FIG. 7 is a circuit diagram of one unit pixel of a display device during a first period according to another embodiment. FIG. 8 is a circuit diagram of one unit pixel of a display device during a second period according to another embodiment. FIG. 9 is a circuit diagram of one unit pixel of a display device during a third period according to another embodiment. FIG. 10 is a circuit diagram of one unit pixel of a display device during a fourth period according to another embodiment. FIG. 6 illustrates signals applied to one unit pixel (PXL) of the display device during the sensing period. The first period t1 may be the initialization period, the second period t2 may be a tracking period, the third period t3 may be a reference voltage setting period, and the fourth period t4 may be the sensing period, for example.

Referring to FIGS. 6 and 7, during the initialization period t1, the scan signal SCAN has the first voltage VGH1 and the first switch SPRE connected to the reference voltage line REF is turned on. Thus, the first reference voltage VpreS is applied to the reference voltage line REF, and the sensing data voltage SVdata is applied from the data line. The scan signal SCAN may have the first voltage VGH1 that turns on the first and second switch elements ST1 and ST2. During the initialization period t1, the sensing data voltage SVdata is applied to the first node N1 and the first reference voltage VpreS is applied to the second node N2, so that the sensing data voltage SVdata is applied to the gate electrode of the driving element DT, and the first reference voltage VpreS is applied to the source electrode of the driving element DT. Accordingly, the difference voltage Vgs between the voltage Vg of the gate electrode of the driving element DT and the voltage Vs of the source electrode of the driving element DT is initialized.

In order to apply the sensing data voltage SVdata to the first node N1, the first voltage VGH1 has a voltage level that turns on the first switch element ST1, and the first voltage VGH1 may have a voltage sufficiently higher than the sensing data voltage SVdata. For example, the first voltage VGH1 may have a voltage higher than the sum of the sensing data voltage SVdata and the threshold voltage of the first switch element ST1. Similarly, in order to apply the first reference voltage VpreS to the second node N2, the first voltage VGH1 has a voltage level that turns on the second switch element ST2, and the first voltage VGH1 may have a voltage sufficiently higher than the first reference voltage VpreS. For example, the first voltage VGH1 may have a voltage higher than the sum of the first reference voltage VpreS and the threshold voltage of the second switch element ST2.

Next, referring to FIGS. 6 and 8, during the tracking period t2, the scan signal SCAN has the first voltage VGH1, and the first switch SPRE connected to the reference voltage line REF is turned off.

The sensing data voltage SVdata is applied to the first node N1, and the sensing data voltage SVdata has a voltage level capable of turning on the driving element DT, so that the driving element DT turns on, and current flows from the drain electrode to source electrode of the driving element DT. Since the first switch element ST1 is turned on and the sensing data voltage SVdata is applied to the first node N1, the voltage Vg of the first node N1 is maintained at the magnitude of the sensing data voltage SVdata. On the other hand, although the second switch element ST2 is turned on, since the first switch SPRE connected to the reference voltage line REF is turned off, the reference voltage line REF is floating. The voltage Vs of the second node N2 increases because the current flows from the drain electrode to source electrode of the driving element DT. Meanwhile, the degree to which the voltage Vs of the second node N2 increases is related to the current flowing through the second node N2, and the current flowing through the second node N2 may be proportional to the difference voltage Vgs between the voltage Vg of the gate electrode of the driving element DT and the voltage Vs of the source electrode of the driving element DT. As the voltage Vs of the second node N2 increases, the difference voltage Vgs between the voltage Vg of the gate electrode of the driving element DT and the voltage Vs of the source electrode of the driving element DT gradually decreases and the magnitude of the current flowing through the second node N2 gradually decreases, so that the increasing degree of the voltage Vs of the second node N2 may gradually decrease during the tracking period t2. During the period in which the voltage Vs of the second node N2 during the tracking period t2 is smaller than the threshold voltage VOLED or OLED Vth of the light emitting element EL, all of the current flowing through the second node N2 is supplied to the reference voltage line REF and stored in the sensing capacitor Csen connected to the reference voltage line REF.

When the voltage Vs of the second node N2 during the tracking period t2 exceeds the threshold voltage VOLED, OLED Vth of the light emitting element EL, the light emitting element is conducted and the current of the second node N2 flows to the light emitting element, so that the voltage Vs of the second node N2 is maintained at the same level as the threshold voltage of the light emitting device. Since the magnitude of the voltage Vs of the second node N2 may be determined through the magnitude of the voltage stored in the sensing capacitor Csen, the voltage Vs of the second node N2 at the time when the magnitude of the voltage stored in the sensing capacitor Csen changes may be determined as the threshold voltage VOLED or OLED Vth of the light emitting element EL of the corresponding pixel PXL.

Subsequently, referring to FIGS. 6 and 9, during the reference voltage setting period t3, the scan signal SCAN has the third voltage VGL, and the second switch RPRE connected to the reference voltage line REF is turned on, so that the second reference voltage VpreR is applied to the reference voltage line REF. The scan signal SCAN may have the third voltage VGL that turns off the first and second switch elements ST1 and ST2. Since the scan signal SCAN has the third voltage VGL, the first and second switch elements ST1 and ST2 may be simultaneously turned off.

In order for the first switch element ST1 to be turned off, the third voltage VGL may be smaller than each of the first and second voltages VGH1 and VGH2, and may be smaller than the sum of the sensing data voltage SVdata and the threshold voltage of the first switch element ST1. In order for the second switch element ST2 to be turned off, the third voltage VGL may be smaller than the sum of the voltage of the second node N2 and the threshold voltage of the first switch element ST1. Since the voltage Vs of the second node N2 during the tracking period t2 is greater than or equal to the threshold voltage VOLED or OLED Vth of the light emitting element EL, the third voltage VGL may be smaller than the sum of the threshold voltages VOLED or OLED Vth of the light emitting element EL and the threshold voltage of the first switch element ST1.

Meanwhile, since the first and second switch elements ST1 and ST2 are turned off during the reference voltage setting period t3, the difference voltage Vgs between the voltage Vg of the gate electrode of the driving element DT determined during the tracking period t2 and the voltages Vs of the source electrode of the driving element DT is maintained even during the reference voltage setting period. The voltage Vg of the first node N1 and the voltage Vs of the second node N2 during the tracking period t2 may be maintained even during the reference voltage setting period t3. However, it is not limited thereto and as illustrated in FIG. 6, when moving from the tracking period t2 to the reference voltage setting period t3, the voltage Vg of the first node N1 and the voltage Vs of the second node N2 may partially decrease and, in some embodiments, may partially increase, but is not limited thereto. The second switch RPRE connected to the reference voltage line REF is turned on, and the second reference voltage VpreR is applied to the reference voltage line REF. The second reference voltage VpreR may be a voltage smaller than the threshold voltage VOLED or OLED Vth of the light emitting element EL. A voltage corresponding to the second reference voltage VpreR may be stored in the sensing capacitor Csen.

Next, referring to FIGS. 6 and 10, during the sensing period t4, the scan signal SCAN has the second voltage VGH2, and the first switch RPRE connected to the reference voltage line REF is turned off. The second voltage VGH2 may have a voltage level that turns on the second switch element ST2 and turns off the first switch element ST1. The second voltage VGH2 may be lower than the first voltage VGH1 and higher than the third voltage VGL. During the reference voltage setting period t3, since the second reference voltage VpreR is set on the reference voltage line REF and the second reference voltage VpreR is smaller than the threshold voltages VOLED and OLED Vth of the light emitting element EL, current flows from the drain electrode to source electrode of the second switch element ST2. Meanwhile, the magnitude of the current flowing from the drain electrode to source electrode of the second switch element ST2 is determined in direct proportion to the difference voltage Vgs between the first node N1 and the second node N2. The voltage Vs of the second node N2 is set to the second reference voltage VpreR when passing from the reference voltage setting period t3 to the sensing period t4. Since the second reference voltage VpreR is smaller than the voltage Vs of the second node N2 during the reference voltage setting period t3, when the sensing period t4 starts, the voltage Vs of the second node N2 may cause a voltage drop by a predetermined voltage value. The predetermined voltage value at which the voltage drop occurs may be a difference voltage between the voltage Vs of the second node N2 and the second reference voltage VpreR during the reference voltage setting period t3. Meanwhile, since the first switch element ST1 is turned off and the switches SPRE and RPRE are turned off, the difference voltage Vgs between the first node N1 and the second node N2 is maintained at a constant level. Furthermore, since current flows from the drain electrode to source electrode of the second switch element ST2 and the difference voltage Vgs between the first node N1 and the second node N2 is maintained at a constant level, the voltage Vs of the second node N2 may increase in direct proportion to time ($\Delta t \propto \Delta V$), as illustrated in FIG. 6. Similarly, since the difference voltage Vgs between the first node N1 and the second node N2 is maintained at a constant level, the voltage Vg of the first node N1 may also increase in direct proportion to time, as illustrated in FIG. 6.

Meanwhile, as described above, during the sensing period t4, since the first switch element ST1 is turned off and the second switch element ST2 is turned on, the second voltage VGH2 should be set in consideration of the voltage Vg of the first node N1 that increases in direct proportion to time and the voltage Vs of the second node N2.

$$VpreR + \Delta V < VGH2 \quad \text{[Equation 1]}$$

(Here, ΔV is the magnitude of the increase of the voltage Vs of the second node N2 during the sensing period t4)

$$SVdata + VpreR - VOLED > VGH2 \quad \text{[Equation 2]}$$

(Here, VOLED means the voltage Vs of the second node N2 during the reference voltage initialization period t3, and it is assumed that the voltage Vs of the second node N2 is equal to VOLED during the reference voltage initialization period t3)

During the sensing period t4, the voltage Vs of the second node N2 is stored in the sensing capacitor Csen.

Then, the switch SAM is turned on during the sampling period. Accordingly, the voltage applied to the reference voltage line REF (or the voltage stored in the capacitor Csen) is applied to the data driver (see the reference sign of 12 in FIG. 1) via the ADC through the reference voltage line REF.

The data driver (see the reference sign of 12 in FIG. 1) receiving the voltage applied to the reference voltage line REF (or the voltage stored in the capacitor Csen) may calculate the degradation characteristics of the corresponding driving element DT.

Although the embodiments of the disclosure have been described with reference to the accompanying drawings, it will be understood by those of ordinary skill in the art that the embodiments may be implemented in other specific forms without changing the technical spirit or essential features of the disclosure. Accordingly, it should be understood that the embodiments described above are merely examples for purposes of description and do not limit the disclosure in any respect.

DESCRIPTION OF REFERENCE NUMERALS

10: display panel
11: timing controller
12: data driver
13: gate driver
14: sensing circuit
15: power circuit

What is claimed is:

1. A display device comprising:

a pixel circuit including a driving element having a gate electrode connected to a first node and a source electrode connected to a second node, a light emitting element connected to the second node, a first switch element that connects a data line charged with a sensing data voltage and the first node based on a scan-on voltage from a gate line, and a second switch element that connects a reference voltage line initialized to have a first ground voltage and the second node based on the scan-on voltage from the gate line;

a gate driver configured to supply a scan signal with the scan-on voltage to the gate line; and a sensing circuit configured to sense a voltage of the reference voltage line changed by a current flowing through the driving element during a sensing period, wherein during an initialization period that precedes the sensing period, the scan-on voltage of the scan signal is greater than the sensing data voltage, during the sensing period, the scan-on voltage of the scan signal is greater than the first ground voltage and less than the sensing data voltage, during the sensing period, a voltage of the second node that is proportional over time and caused by a constant current is stored in a sensing capacitor that is connected to the reference voltage line.

2. The display device of claim 1, wherein during the initialization period, both the first switch element and the second switch element are turned on in response to the scan-on voltage of the scan signal that is greater than the sensing data voltage, and during the sensing period, the first switch element is turned off and the second switch element is turned on in response to the scan-on voltage of the scan signal that is greater than the first ground voltage and less than the sensing data voltage.

3. The display device of claim 2, wherein during the sensing period, a difference voltage between the voltage of the first node and the voltage of the second node is constant.

4. The display device of claim 1, further comprising:

a first switch that connects the reference voltage line to an input terminal of the first ground voltage during the initialization period and disconnects a connection between the input terminal of the first ground voltage and the reference voltage line during the sensing period.

5. The display device of claim 1, wherein during the sensing period, a mobility characteristic of the driving element is calculated based on the voltage of the second node that is stored in the sensing capacitor, is proportional over time, and is caused by a constant current.

6. The display device of claim 1, wherein during a tracking period between the initialization period and the sensing period, the scan-on voltage of the scan signal is greater than the sensing data voltage, and the voltage of the second node gradually increases.

7. The display device of claim 6, wherein during the tracking period, a degree of increase in the voltage of the second node gradually decreases.

8. The display device of claim 6, wherein during the tracking period, the current flowing through the second node initially flows through the reference voltage line and then flows into the light emitting element responsive to the voltage of the second node is equal to or greater than a threshold voltage of the light emitting element.

9. The display device of claim 6, wherein during a reference voltage setting period between the tracking period and the sensing period, the scan-on voltage of the scan signal is less than the voltage of the second node.

10. The display device of claim 9, wherein during the reference voltage setting period, both the first switch element and the second switch element are turned off in response to the scan-on voltage of the scan signal that is less than the voltage of the second node.

11. The display device of claim 10, further comprising:

a second switch that connects an input terminal of a second ground voltage that is greater than the first ground voltage to the reference voltage line during the reference voltage setting period, and disconnecting a connection between the input terminal of the second ground voltage and the reference voltage line during the sensing period.

12. The display device of claim 10, wherein during the reference voltage setting period, a difference voltage between the voltage of the first node and the voltage of the second node is a constant value.

13. The display device of claim 10, wherein during the sensing period, a deterioration characteristic of the driving element is calculated based on a constant current proportional to the voltage stored in the sensing capacitor over time.

14. A display device comprising:

a plurality of pixels, wherein each pixel comprises a pixel circuit comprising:

a driving transistor having a gate electrode connected to a first node and a source electrode connected to a second node;

a light emitting element connected to the second node, a first switch element having a gate electrode connected to a gate line supplied with a scan signal, a source electrode connected to a data line supplied with a sensing data voltage and a drain electrode connected to the first node; and a second switch element having a gate electrode connected to the gate line, a source electrode connected to a reference voltage line and a drain electrode connected to the second node, wherein during an initialization period, a first voltage of the scan signal is greater than the sensing data voltage, and during a sensing period after the initialization period, a second voltage of the scan signal is greater than the first voltage and less than the sensing data voltage, a current flow through the reference voltage line having a constant current, and a voltage through the reference voltage line is directly proportional to time and is stored in a sensing capacitor connected to the reference voltage line.

15. The display device of claim 14, wherein during the initialization period, a first ground voltage from the reference voltage line is supplied to the source electrode of the second switch element, and the first voltage of the scan signal is higher than the first ground voltage, and during the sensing period, the reference voltage line is not supplied with the first ground voltage.

16. The display device of claim 15, further comprising:

a first switch that supplies the first ground voltage to the reference voltage line during the initialization period, and turns off during the sensing period.

17. The display device of claim 16, wherein during a tracking period between the initialization period and the sensing period, both the first switch element and the second switch element are turned on in response to the first voltage, and the first switch turns off.

18. The display device of claim 17, wherein during a reference voltage setting period between the tracking period and the sensing period, both the first switch element and the second switch element are turned off in response to a third voltage that is less than the first voltage and the second voltage.

19. The display device of claim 18, further comprising:

a second switch that supplies a second ground voltage that is greater than the first ground voltage to the reference voltage line during the reference voltage setting period, and turns off during the initialization period, the tracking period and the sensing period.

20. The display device of claim 19, wherein during the reference voltage setting period, a difference voltage between the voltage of the first node and the voltage of the second node is a constant value.

21. The display device of claim 14, wherein during the initialization period, both the first switch element and the second switch element are turned on in response to the first voltage, and during the sensing period, the first switch element is turned off and the second switch element is turned on in response to the second voltage.

* * * * *